Figure 10:
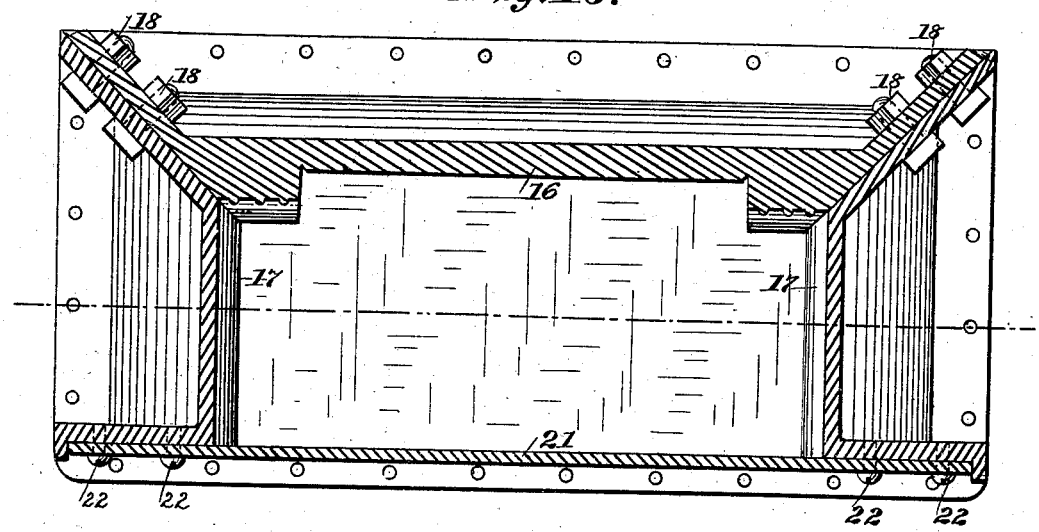

(No Model.) 5 Sheets—Sheet 1.
J. J. C. SMITH.
MANUFACTURE OF ARTICLES OF INDIA RUBBER, &c.
No. 254,716. Patented Mar. 7, 1882.
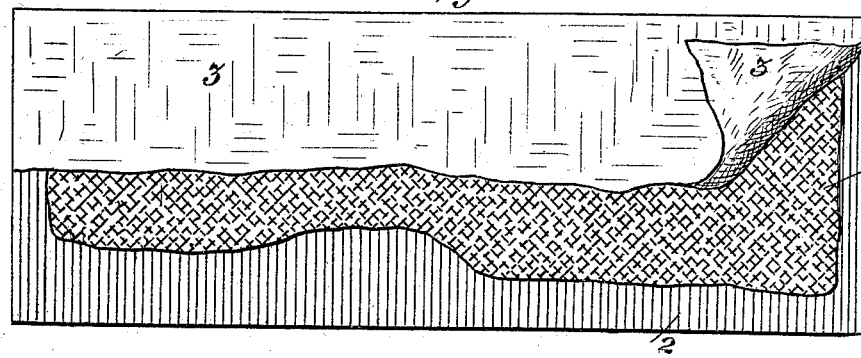
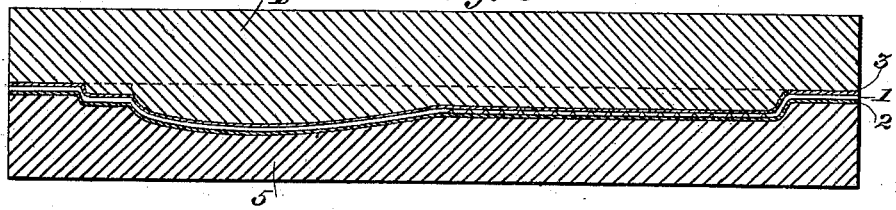
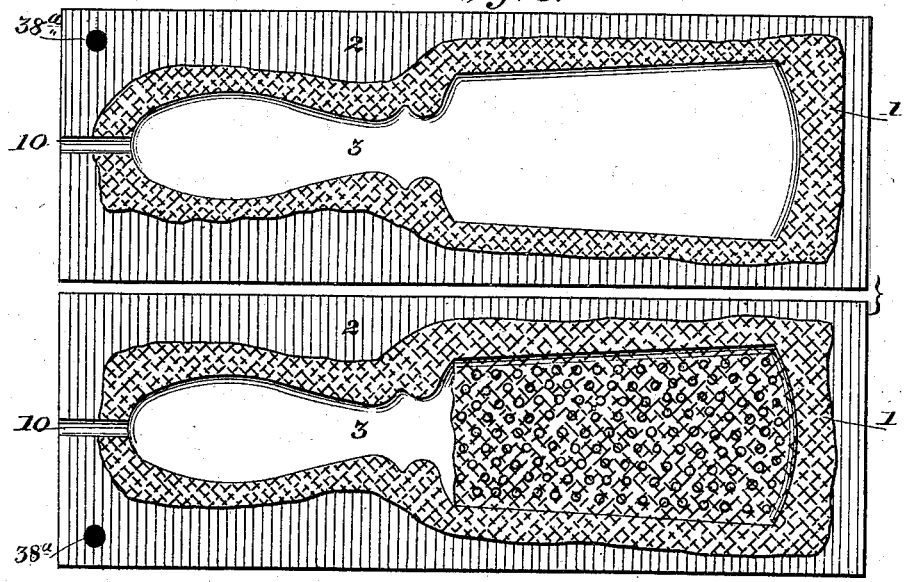
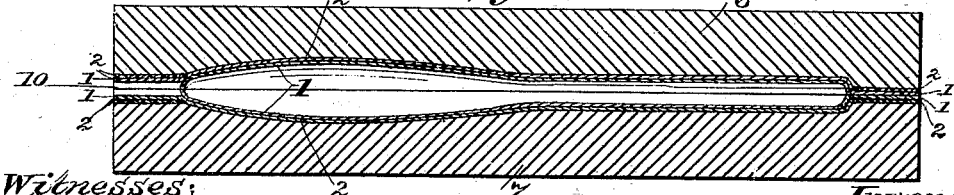
Witnesses:
T. C. Brecht
L. M. Hopkins
Inventor:
John J. C. Smith,
By Knight Bros.
Attorneys.

(No Model.) 5 Sheets—Sheet 2.
J. J. C. SMITH.
MANUFACTURE OF ARTICLES OF INDIA RUBBER, &c.
No. 254,716. Patented Mar. 7, 1882.
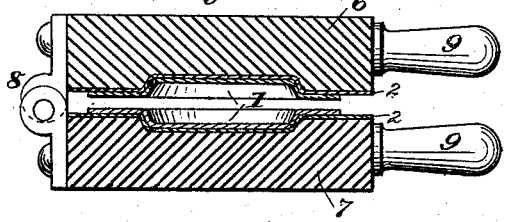
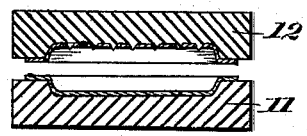
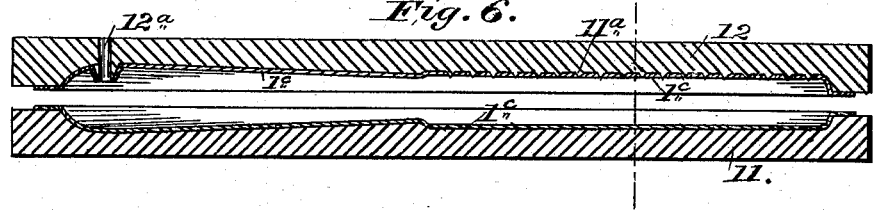
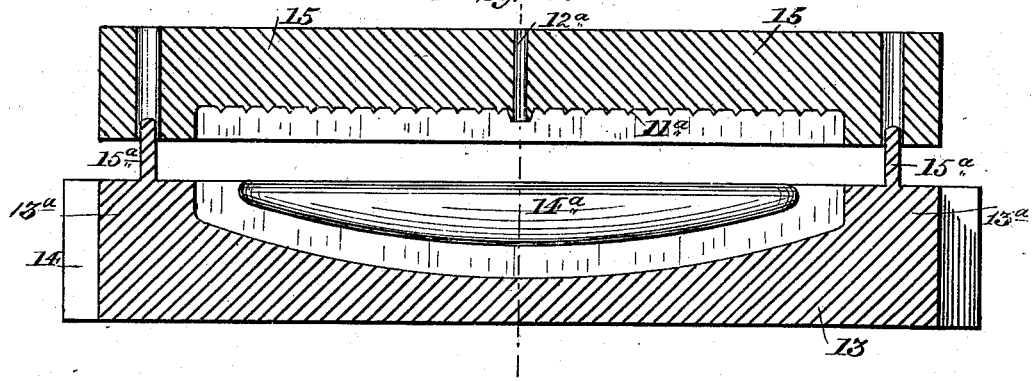
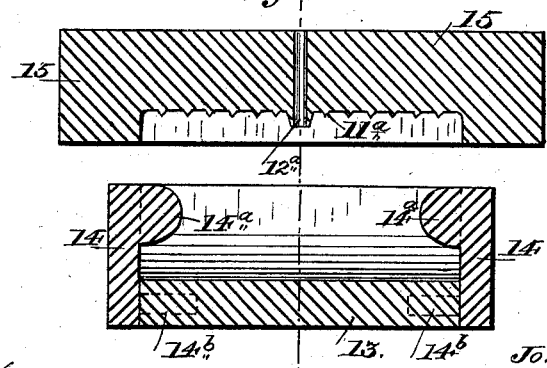
Witnesses:
Inventor:
John J. C. Smith
By Knight Bros.
Attorneys.

(No Model.) 5 Sheets—Sheet 3.

J. J. C. SMITH.
MANUFACTURE OF ARTICLES OF INDIA RUBBER, &c.

No. 254,716. Patented Mar. 7, 1882.

Witnesses:
T. C. Brecht
L. M. Hopkins

Inventor:
John J. C. Smith,
By Knight Bros
Attorneys.

UNITED STATES PATENT OFFICE.

JOHN J. C. SMITH, OF COLLEGE POINT, NEW YORK.

MANUFACTURE OF ARTICLES OF INDIA-RUBBER, &c.

SPECIFICATION forming part of Letters Patent No. 254,716, dated March 7, 1882.

Application filed September 3, 1881. (No model.)

*To all whom it may concern:*

Be it known that I, JOHN JOSEPH CHARLES SMITH, of College Point, in the county of Queens and State of New York, have invented Improvements in the Manufacture of Articles of India-Rubber or other Vulcanizable Gum, of which the following is a specification.

This invention is applicable to the production of a great variety of articles of india-rubber, both for use and ornament. Under one mode of carrying out the invention a sheet of plastic composition suitable for producing hard rubber by vulcanization is laid on a sheet of tin or other ductile metal, and covered with tin-foil to prevent cohesion to the follower. The connected sheets are then placed between dies and pressed or struck up to the required form. In the case of hollow articles, which are formed in two or more parts, a groove is made in the face of each die to produce a ridge of rubber where a junction is to be made between the faces of the halves or parts when they are subsequently placed together preparatory to vulcanization. Before placing the two halves together the foil is removed from their inner faces where the rubber surfaces are to come in contact and form a union.

Where the design is too sharp or delicate to be produced through the medium of ductile sheet metal interposed between the rubber and the die, rigid molds of soft metal are made and used in the following manner: A suitable alloy is made of sixty six parts of lead, thirty parts of tin, and four parts of antimony. This in a molten state, is poured over a hard-metal pattern within a flask or curb preferably made of wood. The molten metal, while cooling, is stirred and worked by means of a trowel or paddle until it acquires a mushy, plastic consistency, when it is immediately placed under a press and subjected to heavy pressure, which forces the plastic metal into all the interstices of the pattern. When removed the mold is ready for use. The molds are heated before being filled, so that the rubber composition may be rendered more plastic. If there are any very deep depressions in the matrix, fragments of the rubber composition are first pressed into these with the fingers, carefully expelling all the air. The whole face of the half-mold is thus covered with a continuous and impervious sheet of rubber composition, which, being rendered very soft and plastic by heat, is pressed into close contact and cohesion with all parts of the matrix, and with the marginal face of the mold around the same.

A pair or set of molds prepared and supplied with rubber composition in either of the modes above described are then laid face to face and pressed together with the necessary force to effect cohesion and union between the meeting surfaces of rubber. To effect this a simple press is used in the case of the rigid mold; but with sheet-metal molds clamp dies are used, approximating in shape to the original dies by which the sheets were formed or struck up, and having straight margins in parallel planes to bear on the marginal flanges of the sheet-metal mold, so as to force together and unite the corresponding marginal ribs or prominences on the meeting faces of the rubber, and avoid distorting the object by pressing the molded sheets out of shape.

At any convenient point or points which the form and nature of the article may render most expedient, one or more openings are provided to admit water to the interior of the object within the mold during vulcanization and permit the free escape of air displaced by the water. If the form of the article makes it desirable to have these apertures at the ends, they are provided either by the introduction of metal tubes or by the formation of corresponding semi-tubular openings in the half-molds, in which the rubber composition is laid and pressed continuously from the inside to the outside and around the margin of the channel in the metal, so that when the parts of the mold are brought together an unbroken duct will be provided to convey water to the interior without the possibility of it being admitted to the slightest extent between the rubber composition and the face of the mold.

In many cases the water-duct can, with less disfigurement of the finished article, be made in the center of one or the other face of the mold. For this purpose a metallic nipple is provided, projecting from the face of the mold, so that the rubber composition may be pressed around it to form a water-tight joint, and opening to the exterior so as to conduct water to the interior of the object within the mold without admitting moisture between the material and the face of the mold. A second small aperture may be provided at what will be the uppermost part of the mold when in the vulcanizer, so as to allow the free escape of displaced air as the water flows in; but by locating the main aperture on top, the one opening is made to serve for the admission of water and escape of air. The molds require no clamps or special fastenings to prevent their separation after they have once been pressed together. The cohesion of the composition and its adhesion to the surfaces of the mold prevent separation in handling, and while in the vulcanizer the external water-pressure tends to hold the parts together, as will presently be described. The molds, being thus charged and prepared, are ready for the vulcanizer.

The vulcanizer is constructed with an interior chamber, which, being filled with the charged molds, is tightly closed with a cover secured against internal pressure, after which water is forced in through a pipe, expelling the air and developing internal pressure, which may be one hundred pounds to the square inch, more or less. The rigid molds are simply laid one on another as closely as possible, so as to economize room. The sheet-metal molds, which are liable to bend out of shape when laid flat, and especially under a superincumbent weight, are suspended from horizontal rods within the vulcanizer. The water-chamber is surrounded by a steam-jacket for producing the necessary heat for vulcanization. The first effect of the heat is to render the rubber composition exceedingly plastic, so that by the internal water-pressure it is forced into close contact with all parts of the matrix, and the most delicate and intricate designs are brought out with sharpness and perfection. It will further appear that while the pressure per square inch of the water within and around the mold is equal, the superior external area causes the sum of pressure to be much greater on the outside than on the inside, and hence the parts of the mold are held together with great force while in the vulcanizer.

In many cases the shape of the article to be produced renders it necessary or expedient to form the mold in more than two parts.

The invention is very well adapted for manufacturing large hollow articles—such as clock-cases—without joints. For this purpose it is preferred to use a rigid mold made in six or more pieces by pressure-casting, as above described.

In order that the manner of carrying the invention into effect may be fully understood, it will now be described (with reference to the accompanying drawings) as applied to the manufacture of hollow rubber articles of various kinds.

Figure 11:
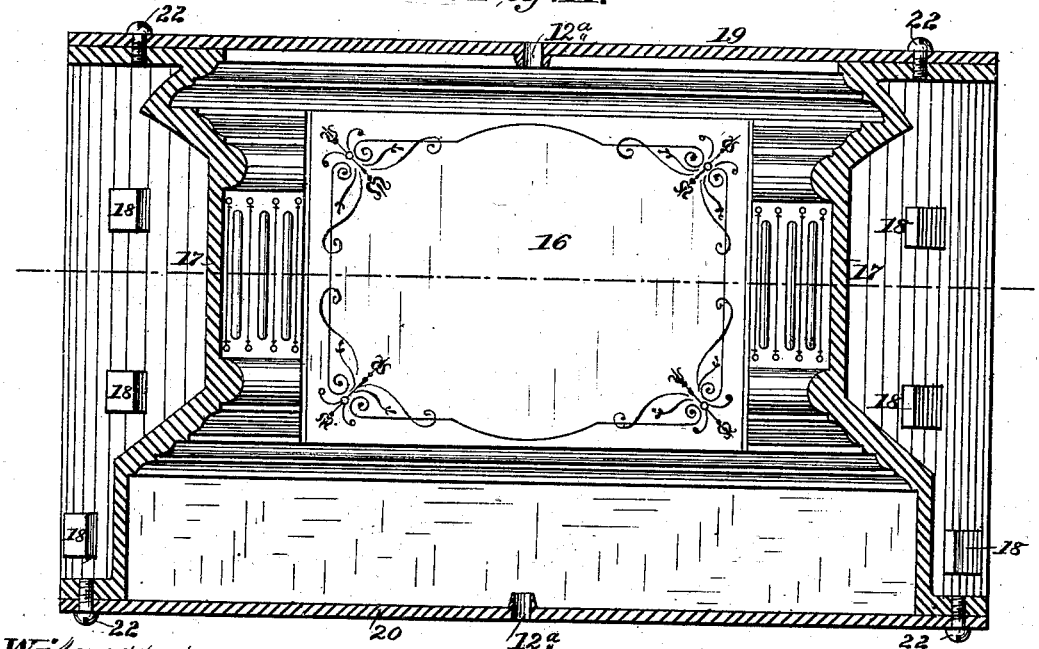
Figure 12:
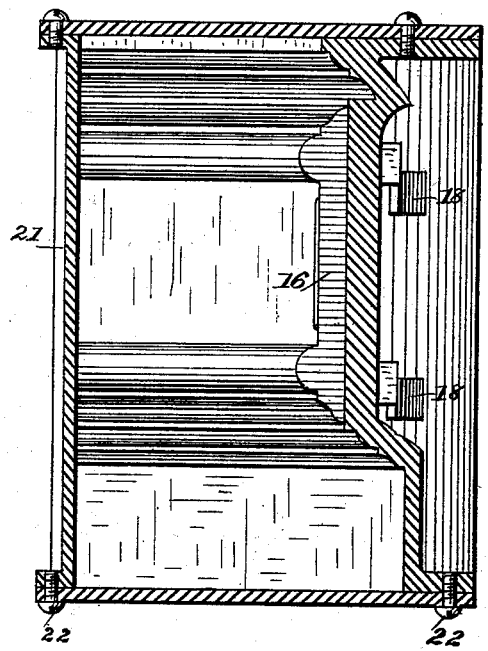
Figure 13:
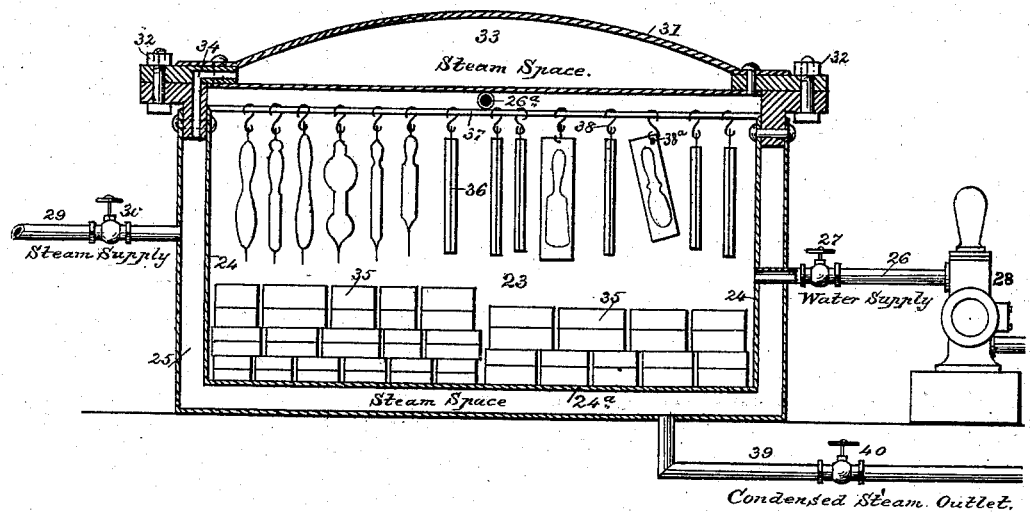
Figure 14:
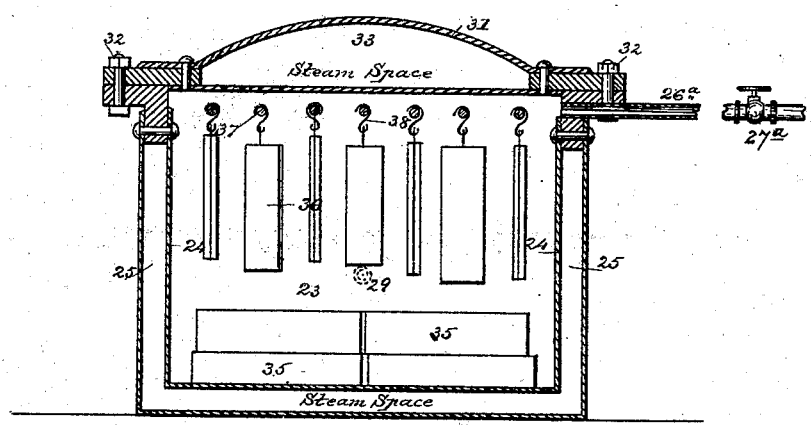

In the drawings, Figure 1 represents a sheet of tin, a sheet of raw-rubber composition, and a tin-foil covering in juxtaposition adapted for introduction between dies, by which they are pressed into the necessary shape to form a half or other part of any desired hollow article. Fig. 2 is a longitudinal section, showing the said sheets between dies pressed into shape to constitute one-half of a hollow brush-body. Fig. 3 is a face view of the front and back portions of the brush-body formed between dies, after the manner represented in Fig. 2, and prepared to be placed together for vulcanizing. Fig. 4 is a longitudinal section, showing the parts placed between a pair of clamp dies suitably formed to press the meeting surfaces together and cause them to cohere, while preserving the shape of the hollow body. Fig. 5 is a transverse section of the same, showing the clamp-dies closed and the hollow body compressed between them. Figs. 6 and 7 are respectively a longitudinal and a transverse section of a two-part vulcanizing-mold adapted for forming hair-brush bodies. Figs. 8 and 9 are respectively a longitudinal and a transverse section of a four-part vulcanizing mold adapted for making brush-bodies of another kind. Figs. 10, 11, and 12 are respectively a horizontal section and longitudinal and transverse vertical sections of a six-part vulcanizing-mold adapted for forming a clock-case. Figs. 13 and 14 are respectively longitudinal and transverse vertical sections of the vulcanizer charged, closed, and filled.

Referring to Figs. 1 and 2, 1 represents a sheet of plastic composition adapted for the production of hard rubber by vulcanization. 2 represents a sheet of block-tin or other ductile metal, to which the sheet 1 of rubber composition is applied preparatory to placing them between forming-dies. 3 represents a sheet of tin-foil or other very thin metal applied to the exposed face of the sheet 1 of rubber composition to prevent its cohesion to the face of the die-follower, with which it would otherwise come in contact. The metallic sheet 2 serves to receive the required form, together with the rubber, and to retain the said form, preventing the distortion of the body of plastic rubber after removal from the dies. Said sheet 2 thus constitutes, after pressure between the dies, as represented in Fig. 2, a mold of such shape as it has acquired from the dies 4 5. The two halves of a brush-body thus formed are shown in Fig. 3, the tin-foil 3 being removed from such portions of the rubber surfaces as are to come together. The parts, being thus prepared, are laid together face to face, as shown in Fig. 4, and placed between clamp-dies 6 7, connected by hinges 8, and provided with handles 9 9 for opening and closing them. The clamp-dies 6 7 are formed on their inner faces to correspond with the molds 2$^a$ 2$^b$, which are shaped between the dies 4 5, as already described with reference to Figs. 2 and 3, and in the present illustration are made to constitute the front and back portions of a hollow brush-body. The dies 6 and 7, being closed, are pressed together with any necessary force to unite the rubber surfaces by a press of common construction.

10 10 represent apertures or tubes for the admission of water to the interior of the hollow articles within the mold and the escape of displaced air therefrom.

Referring to Figs. 6 and 7, 11 12 represent the respective members of a rigid two-part mold within which hollow articles are formed preparatory to vulcanization. Prior to the filling of these molds, the molds and the rubber composition are both heated in order to make the composition more soft and plastic, and permit the pressing of it into all the cavities of the mold. If there be any deep depressions or undercut cavities or intricate designs of any kind, these are first carefully filled with fragments of the plastic composition pressed in with the fingers, so as to completely expel the air, after which the entire face of the mold is covered with a sheet of rubber, as shown at $1^c$, which is laid thereon with great care, beginning at one edge and pressing it closely in with the fingers, so as to drive all the air before it until the other edge of the mold is reached. The face of the mold is thus completely covered with a continuous and impervious sheet of rubber composition in close contact with all parts of the matrix without any air between. The rubber is carried above the margin of the matrix all round, as shown at $1^d$. The two parts of the mold thus prepared are laid face to face and pressed together, the projections $1^d$ of the rubber composition coming together and forming a perfect union, so that the hollow rubber body thus formed will confine the water which is forced into its cavity preparatory to vulcanization and prevent the entrance of any water between the rubber and the face of the mold. An inwardly-projecting nipple to admit water to the interior of the hollow article is shown at 12. Around this the plastic rubber is carefully pressed, so as to form a perfectly water-tight joint. The parts being then placed together, the charged mold is ready for the vulcanizer, which will be hereinafter described. $11^a$ represents projections on the face of the mold-cap to produce depressions in the face of the brush-body to indicate where it is to be drilled for the reception of bristles.

In many instances the shape of the article to be produced renders it impracticable to form it within a rigid mold of two parts, as illustrated in Figs. 6 and 7. In such case the mold is made in four or more parts, as circumstances may require. Figs. 8 and 9 illustrate the application of the invention to the making of brush-bodies having deep cavities in their sides to receive the fingers. The form shown in this illustration is especially intended for a flesh-brush, but is well adapted for many kinds of brushes to be grasped by the hand. 13 represents the base of the mold, the interior surface of which is formed and adapted to impart any desired shape and ornamentation to the back of the brush. On the base are formed end pieces, $13^a$, and to it are applied side pieces, 14 14, made separable to permit the removal of the finished hard-rubber article from the mold, said side pieces being provided with upwardly-projecting ridges $14^a$, for the purpose of producing cavities in the sides of the brush to afford an effective hold to the fingers and thumb of the user. The side pieces, 14, are connected to the base 13 by dowels $14^b$.

15 represents the cap of the mold, the inner surface of which forms the face of the brush-body, said surface having, as in the other illustrations, small projections $11^a$, properly arranged, to produce depressions in the face of the brush-body to indicate where it is to be drilled to receive the tufts of bristles. In the center of the cap 15 is applied the nipple 12, to admit water to the interior preparatory to and during vulcanization. The cap 15 is held in proper position on the base by dowels $15^a$. This mold is shown empty for clearness of representation; but the manner of filling it will be clearly understood from the description above given with reference to the molds 11 12.

The base 13 and side pieces, 14 14, being placed together and properly heated, a sheet of plastic-rubber composition in a warm state is laid over the ornamented surface of the base, beginning with one side, and carefully pressing out the air before it with the fingers, as before described, and the warm plastic composition is in like manner pressed carefully into the cavities beneath the projecting ridges $14^a$ of the side pieces and around the said ridges, as well as around the interior faces of the end pieces of the base, until the entire base and sides of the mold are completely covered with the composition, which has been pressed into close contact with all parts of the surface, and is carried up completely to the upper part of the base all around. The inner surface of the cap 15 of the mold is then in like manner covered with plastic rubber, which is pressed thoroughly over all parts of the interior surface of the heated mold-cap and closely around the nipple 12, so as to prevent any passage of water around said nipple beneath the rubber. The rubber composition is also brought up to the margin of the cavity in the mold-cap, so as to present all around a projecting edge ready to unite with the projecting margin of the filling of the base of the mold and is then ready for the vulcanizer.

The invention is of great value and importance for the molding of hollow rubber articles of large size in solid metal molds under the application of internal water-pressure. For the purpose of illustrating this application of the invention a mold for clock-cases is shown in Figs. 10, 11, 12, the said molds being in practice eighteen or twenty inches long, or of any desirable size, one of the merits of the present invention being that its use is not limited to articles of small size.

16 represents the front of the mold, the interior surfaces of which are made with any desired configuration and ornamentation. The ends 17 17 are connected with the front by miter-joints, and firmly secured thereto by bolts 18 18, the said end plates being formed in correspondence with the front or any suitable way, and ornamented as desired. The ornamental or irregular parts of the mold, being connected together, are covered with the plastic-rubber composition, the mold and composition being heated, as before explained, and the mode of applying the rubber to the mold being substantially similar. Great care is always necessary to press the rubber into close contact with all parts of the surface and expel all air from beneath it.
The intelligent and skilled operator will readily understand from the character and shape of each mold where and in what manner it is necessary to apply the first fragments of rubber and subsequently the continuous sheets, so as to perfectly exclude all air from between the rubber and the surface of the mold. The coating or charging of the mold being thus accomplished, the rubber composition will be in one continuous body all over the surface, and the mold is ready for the application of the top, bottom, and back plates, 19, 20, and 21. These, being covered with sheet-rubber composition, which adheres to all the surfaces, are pressed into place and secured by screws 22.
Nipples to admit water to the interior of the hollow body and permit the escape of the displaced air are shown at 12 12, as before.

A vulcanizing-vessel, such as is used in carrying out this invention, is illustrated in Figs. 13 and 14. It is constructed with an interior water-chamber, 23, the walls 24 and bottom 24$^a$ of which are completely surrounded by a steam-jacket, 25.

26 represents a pipe admitting water to the interior chamber, 23, and 26$^a$ a pipe for the escape of displaced air. These pipes are provided with stop-cocks 27, and the pipe 26 is connected with a force-pump, 28, for producing water-pressure within the chamber 23.
29 is a pipe for admitting steam to the steam-space 25, said pipe being governed by a stop-cock, 30.

31 represents the cap or cover, which is secured to the body of the vulcanizer by bolts 32, adapted to sustain the heavy internal pressure applied to the water in the chamber 23. Within the cover 31 is a steam-space, 33, connected by a duct, 34, with the main steam-space 25, surrounding the vulcanizing-chamber.

In operation the various molds, having been charged with rubber composition in any of the modes hereinbefore described, are placed in the vulcanizing-chamber 23, the rigid molds being stacked compactly in the bottom of the vulcanizing-chamber to any necessary height, as shown at 35 35. The molds which are formed of ductile-metal plates, as described with reference to Figs. 1, 2, and 3, are suspended within the chamber, as shown at 36, by means of rods 37 and suitable hooks, 38, a simple aperture, 38$^a$, formed in one end of the mold-plate 2, Figs. 1 and 2, affording convenient means of suspension from said hooks. The vulcanizing-chamber, being thus completely stocked with material, may be filled with water through the pipe 26, either before or after the application of the cap or cover 31. The nipples 12, already described, being carefully placed uppermost in all the molds, the water will pass freely within the hollow articles in said molds, and all the contained air, being displaced by such water, will escape therefrom, all the air passing out of the vulcanizing-chamber 23 as the latter fills with water. The cover 31 being secured in position, a water-pressure of one hundred pounds to the square inch (more or less) is produced within the vulcanizing-chamber 23 by means of the force-pump 28, and this pressure, acting on the exterior surface of all the molds, holds them together with great force, while at the same time the pressure of the water in the interior of the hollow body forces the material into close and intimate contact with all parts of the interior surfaces of the mold. The cock 27 being closed to confine the water within the vulcanizing-chamber, steam is introduced to the surrounding space 25 and the top space, 33, in the cover through the pipe 39 and duct 34. The heat from the steam is quickly conducted through the water and the metal molds within the vulcanizing-chamber. The requisite heat for vulcanization is thus developed, and is maintained for the requisite time to produce hard rubber. It will be apparent that the first effect of the heat is to soften the rubber composition within the molds, and by expansion of the water to press the material with still greater force in contact with the mold-surfaces, the result of which is a very sharp and perfect reproduction of the most intricate and elaborate designs, and this pressure is maintained until vulcanization is completed.

39 is a pipe for taking water of condensation from the steam-space 35. The end of the said pipe is closed by a valve, 40.

It is well known that hollow articles (generally of small size) have been vulcanized by filling the interior with water, plugging it up, and then placing the mold under water, the surface of which is exposed directly to the steam employed to produce heat and pressure within the vulcanizer. This mode has been found uncertain in its results, because the steam afforded only an elastic and variable external pressure, and the internal pressure produced by simply heating the confined body of water contained in the hollow article within the mold was not sufficient to force the material into sufficiently close contact with all parts of the matrix. Hence it was impossible to produce delicate and elaborate designs with sharpness and perfection; but this result is effectually attained by the improved mode now devised, in which water is forced under a heavy initial pressure into the vulcanizing-chamber, both around and within the hollow articles, completely filling the vulcanizer, and being confined without contact of air or steam, (which form an elastic cushion,) the pressure being increased by the heat requisite for vulcanization, which heat is applied by steam acting, not on the surface of the water, but through the iron walls of the interior vulcanizing-chamber.

The present invention will thus be seen to constitute an important improvement on what has gone before in the manufacture of hollow articles of hard rubber.

The invention is also clearly distinguished from a mode heretofore devised of vulcanizing hollow articles in soft rubber, under both internal and external pressure, inasmuch as the plastic and cohesive nature of the hard-rubber composition, especially when hot, adapts the meeting surfaces to cohere and form a perfect union and exclude water from between the material and the face of the mold without requiring an external sack or envelope to exclude water or clamps to hold the parts of the mold together.

It is also well known that solid articles have been molded by covering the body of composition on both sides with sheet metal and compression between dies. An important distinction in the present improvement consists in stamping or pressing of the respective halves or parts of hollow articles between foil and sheet metal, removing the foil from the inner face, so far as necessary, pressing the two inner faces together, so as to cause the rubber surfaces to unite, and then vulcanizing under pressure.

Having thus described my invention, the following is what I claim as new therein and desire to secure by Letters Patent:

1. The process of making hollow articles of rubber or other vulcanizable gum, by pressing the separate halves or parts in suitable molds or dies between sheet metal and foil, then removing the foil from surfaces which are to be joined together, uniting the parts under pressure, and vulcanizing the hollow articles in water under pressure, the water being admitted to the interior to prevent collapsing.

2. The process of forming hollow articles of rubber or other vulcanizable gum, which consists in pressing plastic rubber composition into the parts of the mold while they are in a heated state, placing them together, so as to cause cohesion between the margins of the rubber in the respective parts of the mold, and then vulcanizing under water-pressure admitted to the interior of the article as well as to the outside of the mold.

3. The process of vulcanizing articles of rubber or other vulcanizable gum, which consists in placing them together with their molds in a tightly-closed vessel, completely filling said vessel with water under pressure, and subjecting the whole to the necessary degree of heat for a proper length of time.

J. J. C. SMITH.

Witnesses:
J. M. F. WIRLEIN,
HENRY HORN.